2,760,860

BEARING ALLOY

Victor Gallatin, Detroit, and James C. Gould, Ann Arbor, Mich., assignors to Federal-Mogul Corporation, Detroit, Mich., a corporation of Michigan No Drawing. Application June 4, 1952,
Serial No. 291,792

7 Claims. (Cl. 75—144)

This invention relates broadly to aluminum alloys and more particularly to an aluminum alloy which is primarily adapted and pre-eminently suited for use as a bearing metal and to bearings manufactured according to the teachings herein.

Bearings may be cast or manufactured from rolled stock, depending upon the exigencies of the particular situation. Consequently, a good bearing metal of universal application must be a good casting metal and it also must be capable of being rolled. In this latter connection, it is desirable to hot-roll the bearing metal as this eliminates the tedious time-consuming and expensive alternate rolling and annealing steps required by cold-rolling.

It is an object of this invention to provide an aluminum bearing alloy that is a good casting metal and that, if necessary or desirable, can be hot-rolled into sheet form of a desired thickness.

In a specific application thereof it is contemplated that the aluminum bearing alloy of this invention be used in the fabrication of bearings according to the procedures disclosed in our copending application Serial No. 186,258, filed September 22, 1950. In this procedure, a facing of a suitable aluminum alloy is bonded to a backing layer of hard metal such as steel or the like. A suitable solder is used as the bonding media; and of all the solders which are operative in the process, cadmium-zinc solder has been found to be superior in one respect or another.

There is known and available at the present time an aluminum bearing alloy having substantial amounts of tin. We have found, however, that when a facing of this metal is bonded to a hard metal backing layer according to our method referred to specifically above and using the preferred cadmium-zinc solder, tin from the bearing facing layer alloys with cadmium in the solder to form an undesirable low melting alloy and resulting in a bearing which is inferior for many purposes.

It is, therefore, another object of the invention to provide an aluminum bearing alloy that is free from tin or other metals that react undesirably with cadmium-zinc solder used to bond the bearing alloy to a suitable hard metal back.

Still another object of the invention is to provide an aluminum alloy having improved lubricity, hardness, tensile strength, elongation, and yield strength characteristics and adequate resistance to corrosion, which improved characteristics make the alloy particularly suitable for use as a bearing metal.

Yet another object of the invention is to provide an aluminum alloy that is sufficiently strong to sustain loads to which bearings normally are subjected and to resist deformation or flattening in use, resulting in the phenomenon known in the art as "bellmouthing."

Other objects and advantages of the invention will be apparent during the course of the following description.

Specifically, the aluminum alloy of this invention comprises the following elements in the amounts specified below:

| | Per cent |
|---|---|
| Cadmium | 0.5–5.0 |
| Copper | 0.5–4.0 |
| Nickel | 0.5–4.0 |
| Aluminum | Remainder |

Cadmium imparts lubricity to the aluminum base metal and infuses this characteristic in the final alloy, thus enhancing the antifriction property of the metal and increasing its suitability as a bearing material. If cadmium is present in amounts less than 0.5% the lubricity properties of the final alloy are so impaired as to affect adversely the efficacy of the metal as a bearing material. When present in amounts between 0.5 and 5.0%, the cadmium is well retained by and uniformly dispersed throughout the base metal. However, when present in amounts greater than 5.0%, cadmium tends to segregate from the base metal and to accumulate in relatively large globules. When this occurs the lubricity characteristic of the alloy is no longer uniform, and a tendency of this metal to ooze out of the base metal under pressure is markedly increased.

The copper and nickel constituents alloy together and with the aluminum base metal to a considerable extent, and they produce a remarkable effect in the final alloy when incorporated in the amounts specified above. In particular these two metals impart hardness to the alloy without making it brittle so that it cracks or checks in use and at the same time make the alloy sufficiently resilient so that it stands up well under bearing loads. The copper and nickel, when used together, produce greater strength and toughness in the alloy than either of these metals used alone and in the same proportion. Of particular significance is the fact that the improved mechanical properties apparently are retained and remain stable at relatively high temperatures. When present in amounts less than 0.5% the copper and nickel constituents do not harden and toughen the alloy sufficiently to assure a good bearing material. On the other hand, when these elements are present in amounts greater than about 4%, they make the alloy excessively hard and therefore less suitable as a bearing alloy. This latter contingency is most likely to occur if excessive amounts of nickel are used.

While the benefits of the invention are realized to an appreciable and significant extent when the cadmium, copper, and nickel are incorporated in the aluminum base metal in any amounts within the ranges given in the preceding table, they preferably are added in the proportions given below as these amounts give optimum benefits.

| | Per cent |
|---|---|
| Copper | 2 |
| Nickel | 2 |
| Cadmium | 3 |
| Aluminum | Balance |

If the proportions of cadmium, nickel, and copper are decreased from the optimum amounts, the benefits imparted to the final alloy by these constituents are progressively lost. The same thing is true as the proportions of these constituents are added above the optimum amounts. For example, as the proportions of the constituents are decreased below the optimum amount, the lubricity characteristics of the alloy are progressively diminished and the alloy becomes progressively softer, less resilient, more malleable. Also, there is an increased tendency for the alloy to bellmouth in use when used as a bearing material. On the other hand, as the proportions of these additive metals increase above the optimum amounts, the lubricity of the metal gradually increases but there is a simultaneous tendency for the cadmium to accumulate in globules so that the lubricity characteristic is not uniform throughout the alloy. Also, the alloy becomes increasingly hard and there is an increased tendency for it to rupture or check under load.

A satisfactory procedure in preparing the final alloy is to melt the copper and nickel together in one ladle and to melt the aluminum in another ladle. The molten copper-nickel mixture is then added to the aluminum and the mass is thoroughly stirred or otherwise agitated. Cadmium is then inserted into the molten mass in any suitable manner as on the end of a carbon rod in order to prevent it from being destroyed by heat from the molten mass. After the cadmium is introduced in this manner the entire mass is thoroughly agitated and all the constituents are dispersed uniformly throughout the aluminum base metal. There is a marked tendency for the copper and nickel to alloy or form a solid solution with each other and to a certain extent with the aluminum, and the cadmium breaks down into minute globules which become thoroughly and uniformly dispersed throughout the aluminum matrix.

Having described the invention, we claim:

1. An aluminum base alloy capable of being cast and fabricated into strip by either hot or cold working in the manufacture of bearings and the like without objectionable cracking or checking and having improved hardness, tensile strength, elongation and yieldable strength characteristics consisting of from 0.2% to 4.0% copper, from 0.2% to 4.0% nickel, from 0.5% to 5.0% cadmium and the remainder commercially pure aluminum.

2. An aluminum base alloy capable of being cast and fabricated into strip by either hot or cold working in the manufacture of bearings and the like without objectionable cracking or checking and having improved hardness, tensile strength, elongation and yieldable strength characteristics consisting of about 2% copper, from 0.2% to 4.0% nickel, from 0.5% to 5.0% cadmium and the remainder commercially pure aluminum.

3. An aluminum base alloy capable of being cast and fabricated into strip by either hot or cold working in the manufacture of bearings and the like without objectionable cracking or checking and having improved hardness, tensile strength, elongation and yieldable strength characteristics consisting of about 2% nickel, from 0.2% to 4.0% copper, from 0.5% to 5.0% cadmium and the remainder commercially pure aluminum.

4. An aluminum base alloy capable of being cast and fabricated into strip by either hot or cold working in the manufacture of bearings and the like without objectionable cracking or checking and having improved hardness, tensile strength, elongation and yieldable strength characteristics consisting of from 0.2% to 4% copper, from 0.2% to 4.0% nickel, about 3.0% cadmium and the remainder commercially pure aluminum.

5. An aluminum base alloy capable of being cast and fabricated into strip by either hot or cold working in the manufacture of bearings and the like without objectionable cracking or checking and having improved hardness, tensile strength, elongation and yieldable strength characteristics consisting of about 2% copper, about 2% nickel, from 0.5% to 5.0% cadmium and the remainder commercially pure aluminum.

6. An aluminum base alloy capable of being cast and fabricated into strip by either hot or cold working in the manufacture of bearings and the like without objectionable cracking or checking and having improved hardness, tensile strength, elongation and yieldable strength characteristics consisting of about 2% copper, about 2% nickel, about 3% cadmium and the remainder commercially pure aluminum.

7. A bearing having a facing layer consisting of from 0.2% to 4.0% copper, from 0.2% to 4.0% nickel, from 0.5% to 5.0% cadmium and the remainder commercially pure aluminum.

References Cited in the file of this patent

UNITED STATES PATENTS 1,889,417    Mershon _____ Nov. 29, 1932

FOREIGN PATENTS 550,738    Great Britain _____ Jan. 21, 1943

OTHER REFERENCES

Metals Handbook, pub. by Amer. Soc. for Metals, 1948 edition, pp. 753–755.